(12) United States Patent
Nimura et al.

(10) Patent No.: US 11,462,973 B2
(45) Date of Patent: Oct. 4, 2022

(54) ENCODER AND MOTOR

(71) Applicant: Mitsubishi Electric Corporation, Tokyo (JP)

(72) Inventors: Masanori Nimura, Tokyo (JP); Masashi Okuma, Tokyo (JP); Daisuke Kanamori, Tokyo (JP); Haruyuki Hasegawa, Tokyo (JP); Takuya Noguchi, Tokyo (JP); Fumiaki Tsuchiya, Tokyo (JP); Toshikazu Satone, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/045,795

(22) PCT Filed: Apr. 16, 2018

(86) PCT No.: PCT/JP2018/015749
§ 371 (c)(1),
(2) Date: Oct. 7, 2020

(87) PCT Pub. No.: WO2019/202643
PCT Pub. Date: Oct. 24, 2019

(65) Prior Publication Data
US 2021/0159764 A1 May 27, 2021

(51) Int. Cl.
*H02K 11/215* (2016.01)
*H02K 11/22* (2016.01)
(Continued)

(52) U.S. Cl.
CPC ......... *H02K 11/215* (2016.01); *G01D 5/245* (2013.01); *H02K 11/0141* (2020.08); *H02K 11/22* (2016.01); *H02K 2211/03* (2013.01)

(58) Field of Classification Search
CPC .. H02K 11/215; H02K 11/0141; H02K 11/22; H02K 2211/03; H02K 1/27; H02K 11/21; G01D 5/245; G01D 5/2515
(Continued)

(56) References Cited

U.S. PATENT DOCUMENTS 5,327,036 A * 7/1994 Carey ............... H02K 5/20
310/51
6,078,117 A * 6/2000 Perrin ............... H01R 13/719
310/68 R
(Continued)

FOREIGN PATENT DOCUMENTS

CN 101201257 A 6/2008
CN 107819385 A 3/2018
(Continued)

OTHER PUBLICATIONS

1st Office Action of Taiwan Application No. 10811226, dated Sep. 27, 2019, 21 pages.
(Continued)

*Primary Examiner* — Ahmed Elnakib
(74) *Attorney, Agent, or Firm* — Buchanan Ingersoll & Rooney PC

(57) ABSTRACT

An encoder includes: a magnet rotatably supported; a control board including a magnetic field sensor that detects a magnetic field produced by the magnet and outputs a signal, and an arithmetic unit that detects rotation of the magnet on the basis of the output of the magnetic field sensor; a magnetic shielding cover made of a soft magnetic material; an encoder bracket used to fix the magnetic shielding cover; a protective cover fixed with being sandwiched between the magnetic shielding cover and the encoder bracket to cover the magnet and the control board to prevent entry of foreign substances; and a sealing member sandwiched between the protective cover and the encoder bracket. The magnetic
(Continued)

shielding cover covers the magnet, the control board, and the protective cover, and the sealing member is compressed between the encoder bracket and the protective cover.

10 Claims, 6 Drawing Sheets

(51) Int. Cl.
*H02K 11/01* (2016.01)
*G01D 5/245* (2006.01)

(58) Field of Classification Search
USPC .......................................... 310/68 B, 51, 89
See application file for complete search history.

(56) References Cited

U.S. PATENT DOCUMENTS

| | | | |
|---|---|---|---|
| 7,718,951 B2 | 5/2010 | Scharrer et al. | |
| 2002/0135243 A1* | 9/2002 | Kotani | H02K 1/143 310/49.24 |
| 2008/0164866 A1 | 7/2008 | Steinich et al. | |
| 2011/0080162 A1* | 4/2011 | Steinich | G01D 5/2452 324/207.25 |
| 2011/0227563 A1* | 9/2011 | Akahane | G01D 5/145 324/207.25 |
| 2012/0104887 A1* | 5/2012 | Tanaka | H02K 5/08 310/88 |
| 2015/0253155 A1 | 9/2015 | Makiuchi et al. | |
| 2018/0034343 A1* | 2/2018 | Hoch | H02K 5/24 |
| 2018/0306607 A1* | 10/2018 | Wang | H05K 5/0213 |
| 2021/0159764 A1* | 5/2021 | Nimura | H02K 11/0141 |

FOREIGN PATENT DOCUMENTS

| | | | |
|---|---|---|---|
| CN | 107872116 A | | 4/2018 |
| JP | 07035572 | * | 2/1995 |
| JP | H0735572 A | | 2/1995 |
| JP | 2014 033650 | * | 2/2014 |
| JP | 2015169439 A | | 9/2015 |
| TW | 201534870 A | | 9/2015 |
| WO | 2017017806 A1 | | 2/2017 |
| WO | WO 2017017806 | * | 2/2017 |
| WO | 2017046854 A1 | | 3/2017 |

OTHER PUBLICATIONS

2nd Office Action of Taiwan Application No. 10811226, dated Mar. 5, 2020, 19 pages.

International Search Report (PCT/ISA/210) dated Jul. 17, 2018, by the Japan Patent Office as the International Searching Authority for International Application No. PCT/JP2018/015749.

Written Opinion (PCT/ISA/237) dated Jul. 17, 2018, by the Japan Patent Office as the International Searching Authority for International Application No. PCT/JP2018/015749.

Second Office Action dated Mar. 29, 2022, issued in the corresponding Chinese Patent Application No. 201880092273.X, 21 pages including 13 pages of English Translation.

Office Action dated Nov. 2, 2021, in corresponding Chinese Patent Application No. 201880092273.X and English translation of the Office Action. (13 pages).

The Third Examination Opinion Notification issued in Chinese Patent Application No. 201880092273.X, dated Aug. 18, 2022, with English Translation (15 pages).

* cited by examiner

ENCODER AND MOTOR

FIELD

The present invention relates to an encoder that detects a rotation angle of a shaft and a motor equipped with this encoder.

BACKGROUND

A typical motor encoder is provided with a protective cover intended to prevent entry of foreign material into a detecting part thereof. The protective cover is generally screwed to an encoder bracket. Particularly when waterproof and dustproof performance is required, a sealing member such as a rubber O-ring is compressed between a flat part of the encoder bracket and a flat part of the protective cover to make an inside of the cover hermetic, thus achieving enhanced waterproof and dustproof performance.

In addition, for the purpose of preventing an external magnetic field from causing improper functioning, a motor encoder using a magnet to detect a rotation angle is provided with another cover that is a magnetic shielding cover made of a soft magnetic material.

Patent Literature 1 discloses an encoder that includes a soft magnetic cover serving both as a protective cover and a magnetic shielding cover.

CITATION LIST

Patent Literature

Patent Literature 1: Japanese Patent Application Laid-open No. H07-035572

SUMMARY

Technical Problem

The encoder disclosed in Patent Literature 1, however, does not have a seal provided by a method such as compression of an O-ring and thus does not have any certain waterproof and dustproof properties. An inventive technique disclosed in Patent Literature 1 is directed to a structure such that an inner cylindrical surface of the soft magnetic cover in contact with an outer peripheral surface of a bracket, and such a structure leads to a situation where the soft magnetic cover and the bracket touch each other at their respective curved surfaces. Therefore, if the soft magnetic cover of the encoder disclosed in Patent Literature 1 is used to compress the O-ring, the O-ring needs to be compressed between the curved surfaces. When the O-ring is to be compressed between the curved surfaces, a part of the cover to compress the O-ring needs to be processed with increased accuracy. However, press working whose manufacturing cost is low has insufficient working accuracy, so that waterproof and dustproof performance equal to or higher than IP65 in a foreign-substance ingress protection rating that is defined by the International Electrotechnical Commission is difficult to secure. If the cover is to be manufactured by cutting machining, the cover's part to compress the O-ring can be machined with increased accuracy, but its manufacturing cost increases.

The present invention has been made in view of the above circumstances, and an object of the present invention is to provide an encoder that has a magnetic shielding property and waterproof and dustproof properties, whose increase of manufacturing cost is curbed.

Solution to Problem

In order to solve the above-stated problems and achieve the object, the present invention provides an encoder comprising: a magnet rotatably supported; a control board including a magnetic field sensor to detect a magnetic field produced by the magnet to accordingly output a signal, and an arithmetic unit to detect rotation of the magnet based on an output of the magnetic field sensor; a magnetic shielding cover made of a soft magnetic material; a base part used to fix the magnetic shielding cover; a protective cover fixed with being sandwiched between the magnetic shielding cover and the base part, the protective cover covering the magnet and the control board to prevent entry of a foreign material thereinto; and a sealing member sandwiched between the protective cover and the base part, wherein the magnetic shielding cover covers the magnet, the control board, and the protective cover, and the sealing member is compressed between the base part and the protective cover.

Advantageous Effects of Invention

According to the present invention, there is exerted an advantageous effect of achieving an advanced encoder that has a certain magnetic shielding property and certain waterproof and dustproof properties and curbs increase in manufacturing cost thereof.

DESCRIPTION OF EMBODIMENTS

With reference to the drawings, a detailed description is hereinafter provided of encoders and motors according to embodiments of the present invention. It is to be noted that these embodiments are not necessarily intended to limit the present invention.

First Embodiment

Figure 1:
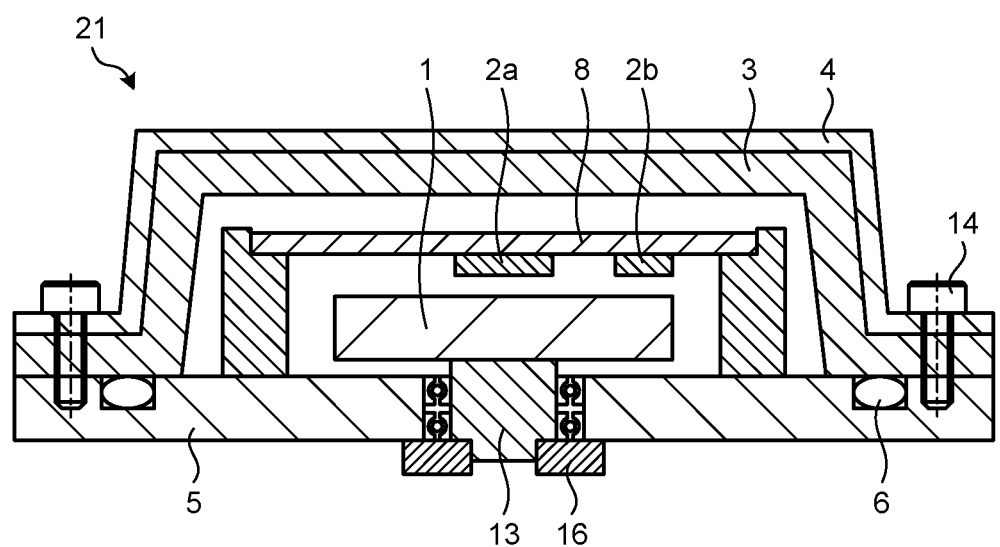
FIG. 1 is a sectional view of an encoder according to a first embodiment of the present invention.
Figure 2:
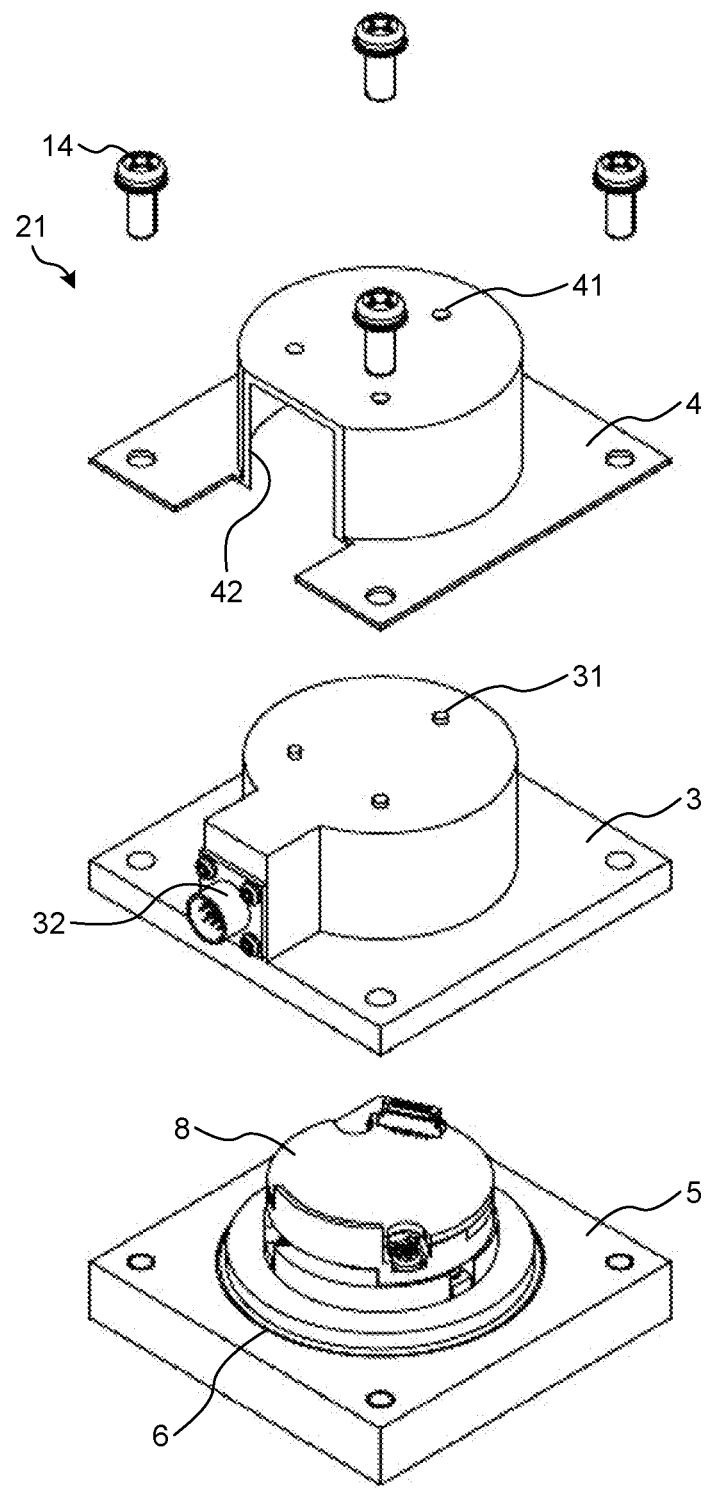
FIG. 2 is an exploded perspective view of the encoder according to the first embodiment.

FIG. 1 is a sectional view of an encoder according to the first embodiment of the present invention. FIG. 2 is an exploded perspective view of the encoder according to the first embodiment. The encoder 21 according to the first embodiment includes: a magnet 1 that is fixed to an encoder shaft 13 and rotatably supported by the shaft, a control board 8 having a magnetic field sensor 2a that detects a magnetic field and outputs a signal and an arithmetic unit 2b that detects rotation of the magnet 1 on the basis of the output of the magnetic field sensor 2a; a resin-made protective cover 3 that prevents any foreign material from entering a part where the magnet 1 is placed; a magnetic shielding cover 4 made of a soft magnetic material; an encoder bracket 5 that is a base part to which the magnetic shielding cover 4 is fixed; and a sealing member 6.

The encoder 21 according to the first embodiment is of a magnetic type. The magnet 1 is fixed by bonding to the encoder shaft 13 that is rotatably supported by the encoder bracket 5. The output of the magnetic field sensor 2a varies according to direction and strength of the magnetic field produced by the magnet 1. The arithmetic unit 2b is capable of detecting a rotation angle of the magnet 1 by performing arithmetic processing based on the output of the magnetic field sensor 2a. A motor shaft is connected to the encoder shaft 13 via a shaft coupling 16. As the motor shaft is rotated by driving of a motor, the magnet 1 is rotated along with the encoder shaft 13.

The sealing member 6 is placed on a flat bottom of a groove provided in the encoder bracket 5, and a flat part of a peripheral portion of the protective cover 3 is contact with the sealing member 6. The protective cover 3 is placed between the magnetic shielding cover 4 made of the soft magnetic material and the encoder bracket 5. The magnetic shielding cover 4 is fixed together with the protective cover 3 by screws 14 to the encoder bracket 5. After the screws 14 are tightened, the sealing member 6 is compressed between the flat part of the protective cover 3 and the flat bottom of the groove of the encoder bracket 5, so that highly effective dustproofing and waterproofing can be secured. It is to be noted that the term "flat" herein refers to a plain surface macroscopically and covers a case where it has some microscopic roughness. Because the sealing member 6 is compressed between flat surfaces, the protective cover 3 and the encoder bracket 5 need not be worked with high accuracy thus not to lead to any factor for increasing a manufacturing cost. An O-ring made of nitrile rubber or silicone rubber is used as the sealing member 6.

The protective cover 3 can be made at a low cost by injection molding using a synthetic resin containing a strength-enhancing filler such as carbon fiber or glass fiber. In the case where a flow outlet for resin used during injection molding is set on a surface of the protective cover 3, gate portions 31 project from the surface of the protective cover 3, each of the portions being a trace of the flow outlet. As illustrated in FIG. 2, holes 41 are formed in the magnetic shielding cover 4 in order to avoid interference between the magnetic shielding cover 4 and the gate portions 31 of the protective cover 3. It is to be noted that the magnetic shielding cover 4 may have notches formed therein so as to avoid the interference with the gate portions 31 of the protective cover 3.

For the magnetic shielding cover 4, a nickel-iron alloy called permalloy having a high magnetic shielding effect can be used, and rolled steel for general structure or a cold-rolled steel plate, either of which is less expensive than the nickel-iron alloy though it is inferior to the nickel-iron alloy in magnetic shielding effect.

Attached to the protective cover 3 is a connector 32 having airtight functionality for supplying power to the control board 8 and putting a communication lead wire between the control board 8 and a servo amplifier out of the protective cover 3 from inside thereof. The magnetic shielding cover 4 is provided with a notch 42 so as not to interfere with a projecting part of the protective cover 3 where the connector 32 is set. It is to be noted that the magnetic shielding cover 4 may have a hole formed therein to avoid the interference with a projecting part of the protective cover 3 where the connector 32 is disposed.

According to the first embodiment, the magnetic shielding cover 4 is fixed to the encoder bracket 5 by the screws 14, so that the encoder 21 does not have impaired magnetic shielding functionality even in an environment where severe vibration, impact, and temperature change are experienced. The screws 14 having a larger nominal diameter can be used to fix the magnetic shielding cover 4, therefore making it possible to prevent a decline in dustproof and waterproof performance, which is caused by insufficient force to fix the magnetic shielding cover 4. Because the sealing member 6 is compressed between the flat surfaces, the protective cover 3 and the encoder bracket 5 need not be worked with high accuracy, the encoder 21 according to the first embodiment can have a magnetic shielding property and waterproof and dustproof properties thereby enabling a manufacturing cost to be minimized to a low cost.

Figure 3:
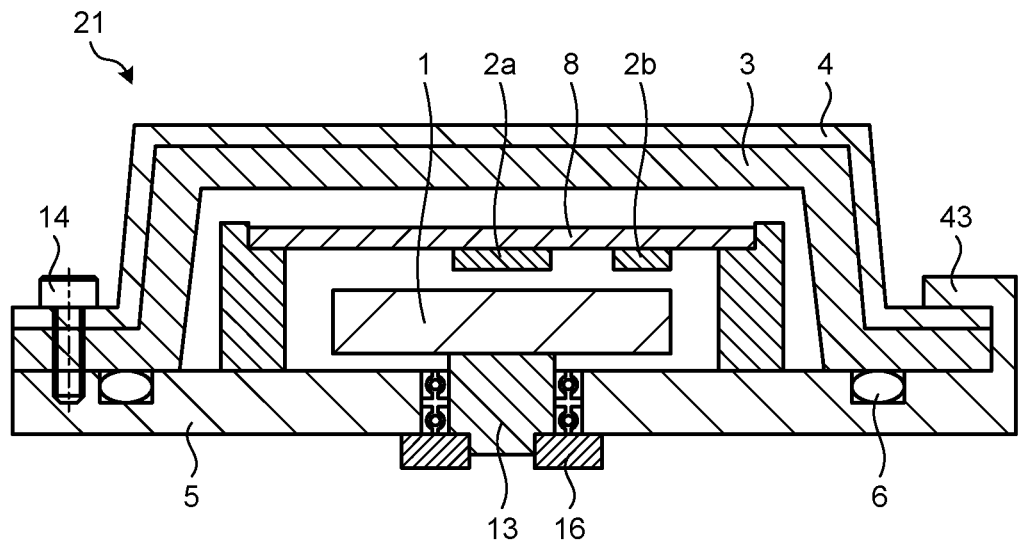
FIG. 3 is a view illustrating a modification of the encoder according to the first embodiment.

FIG. 3 is a view illustrating a modification of the encoder according to the first embodiment. The encoder bracket 5 is provided with a hook part 43, and the magnetic shielding cover 4 and the protective cover 3 are engaged with the hook part 43. The magnetic shielding cover 4 is fixed together with the protective cover 3 by a screw 14 to the encoder bracket 5 on a side opposite from a side provided with the hook part 43. By providing the encoder bracket 5 with the hook part 43 to engage the magnetic shielding cover 4 and the protective cover 3 therewith, the number of man-hours required for screwing can be reduced and thus assembly work can be simplified.

Second Embodiment

Figure 4:
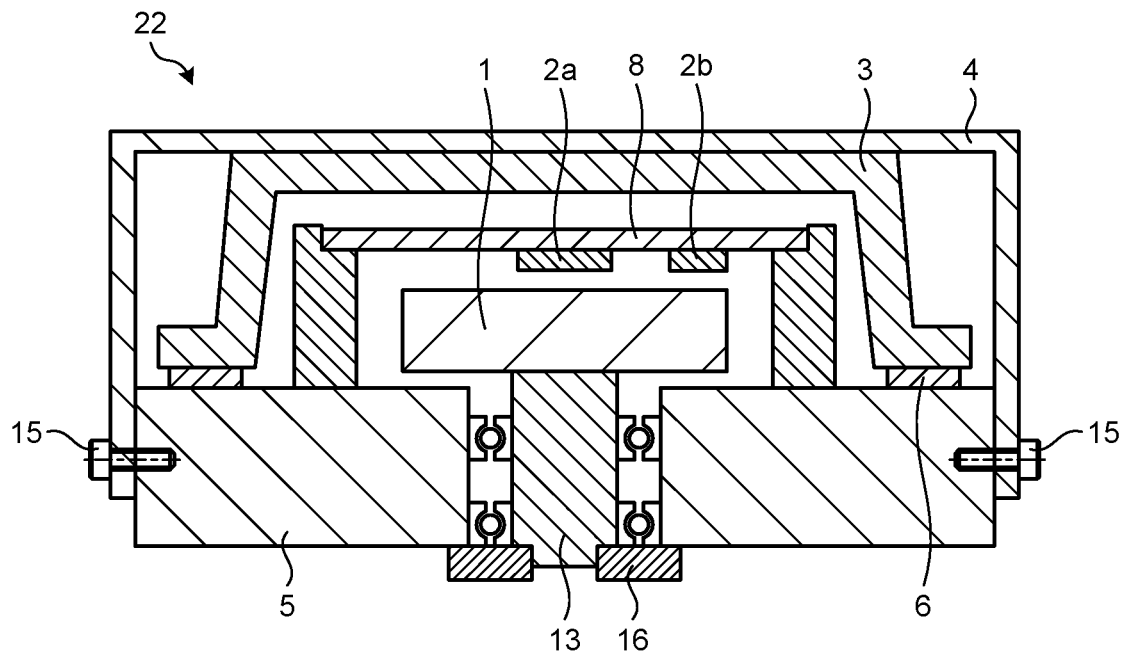
FIG. 4 is a sectional view of an encoder according to a second embodiment of the present invention.

FIG. 4 is a sectional view of an encoder according to the second embodiment of the present invention. In the encoder 22 according to the second embodiment, the sealing member 6 is placed on an end surface of the encoder bracket 5, and the protective cover 3 is disposed in such a manner that a flat part of the protective cover 3 is contact with the sealing member 6. The protective cover 3 is placed between the magnetic shielding cover 4 made of a soft magnetic material and the encoder bracket 5. The magnetic shielding cover 4 and the encoder bracket 5 have a clearance gap that enables them to slide in an axial direction therebetween, and are fixed together by screws 15 in a direction perpendicular to the axial direction. Each of the screws 15 is used to screw shut the magnetic shielding cover 4 on a side of the encoder bracket 5. After the screws 15 are tightened, the sealing member 6 is compressed between the flat part of the protective cover 3 and the flat end surface of the encoder bracket 5, and then a dustproof and waterproof effect can be realized at an IP65 or higher level in a foreign-substance ingress protection rating that is defined by the International Electrotechnical Commission. Because the sealing member 6 is compressed between flat surfaces, the protective cover 3 and the encoder bracket 5 need not be worked or machined with high accuracy and thus do not lead to any factor for increase in manufacturing cost.

A flattened component made of nitrile rubber or silicone rubber is adopted as the sealing member 6. For a material of the protective cover 3, use is made of a synthetic resin that includes a strength-enhancing filler such as carbon fiber or glass fiber. While a typical material of the encoder bracket 5 is a metal such as an aluminum alloy, a synthetic resin including a strength-enhancing filler such as carbon fiber or glass fiber can also be applied therefor. It is noted that the encoder bracket 5 can also be made by insert molding with the metal and the synthetic resin being formed integrally.

Because the sealing member 6 is compressed between the flat end surface of the encoder bracket 5 and the flat surface of the resin-made protective cover 3, the encoder 22 according to the second embodiment can secure waterproof and dustproof performance having an IP65 or higher level in the foreign-substance ingress protection rating that is defined by the International Electrotechnical Commission, as well as get the securement with a low cost. Since the protective cover 3 is fixed with being sandwiched between the magnetic shielding cover 4 and the encoder bracket 5, a female thread for attaching the protective cover 3 need not be formed in the end surface of the encoder bracket 5, and so the encoder 22 according to the second embodiment can be smaller in size.

Figure 5:
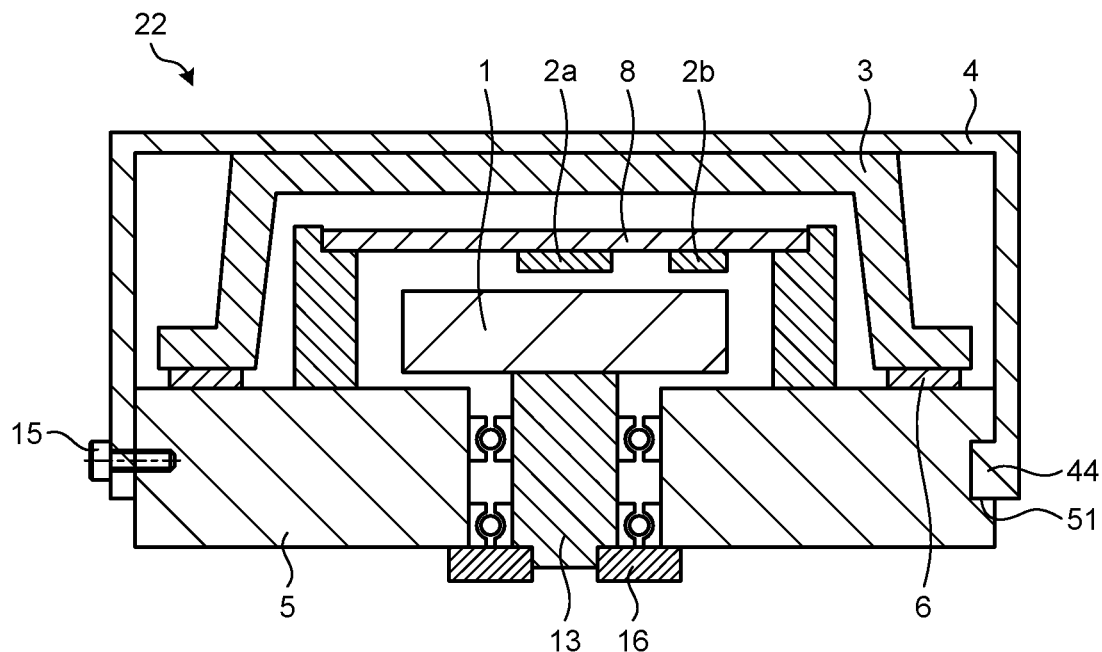
FIG. 5 is a view illustrating a first modification of the encoder according to the second embodiment.

FIG. 5 is a view illustrating a first modification of the encoder according to the second embodiment. With a convex part 44 formed on the magnetic shielding cover 4 being engaged with a concave part 51 formed on the encoder bracket 5, the screw 15 may be used for fixation on a side opposite to an engagement portion between the convex part 44 and the concave part 51. By providing the magnetic shielding cover 4 and the encoder bracket 5 with an engagement therebetween, the number of man-hours required for screwing can be reduced and thus assembly work can be simplified.

Figure 6:
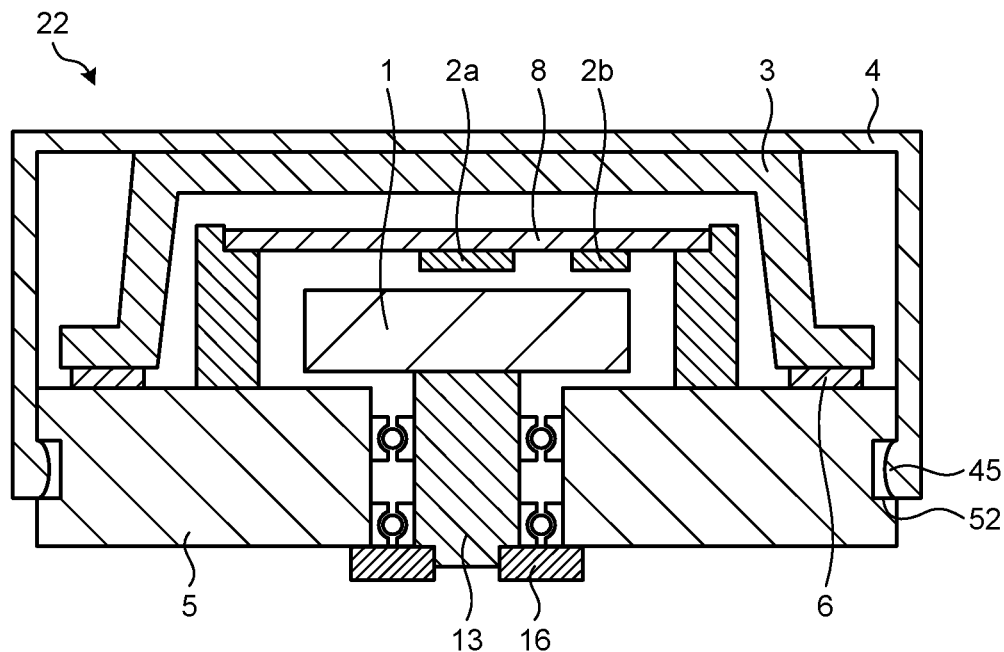
FIG. 6 is a view illustrating a second modification of the encoder according to the second embodiment.

FIG. 6 is a view illustrating a second modification of the encoder according to the second embodiment. The magnetic shielding cover 4 may be provided with a snap-fit convex part 45 and the encoder bracket 5 may be provided with a snap-fit concave part 52 so that the magnetic shielding cover 4 and the encoder bracket 5 are fixed together by snap-fit. By fixing the magnetic shielding cover 4 and the encoder bracket 5 together by the snap-fit, the need for screwing work can be eliminated and thus assembly work can be simplified.

Third Embodiment

Figure 7:
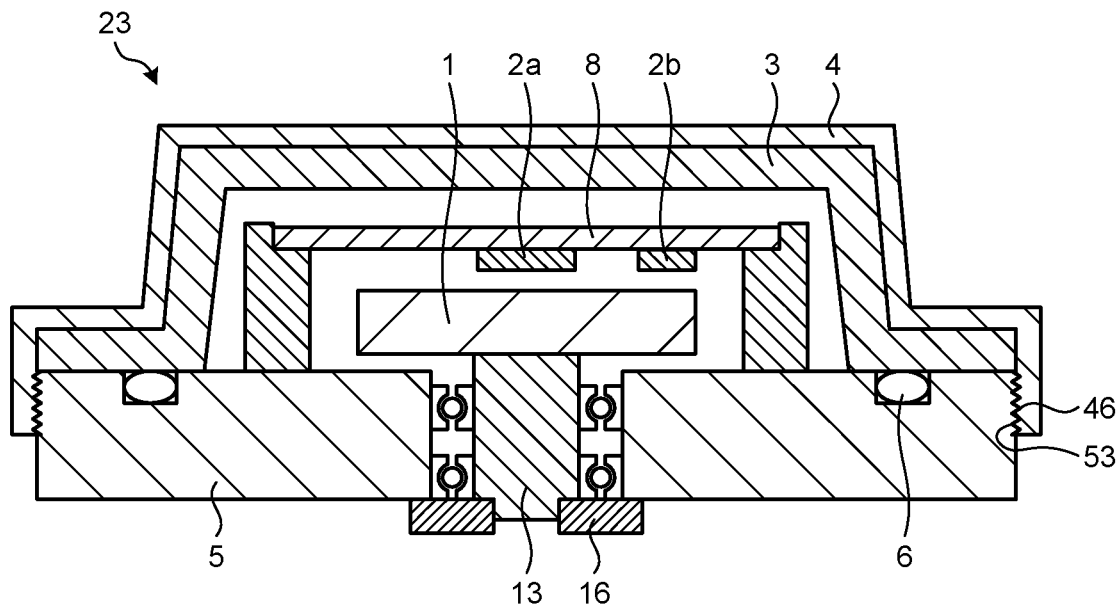
FIG. 7 is a sectional view of an encoder according to a third embodiment of the present invention.

FIG. 7 is a sectional view of an encoder according to the third embodiment of the present invention. According to the third embodiment, the magnetic shielding cover 4 of the encoder 23 is extended to a side face of the encoder bracket 5. The magnetic shielding cover 4 has a female thread 46 formed thereon at a lower part of its inside surface. The encoder bracket 5 has a male thread 53 formed thereon at an upper part of its side face. The magnetic shielding cover 4 of the encoder 23 according to the third embodiment is of a screw-cap type. The male thread 53 and the female thread 46 are tightened together when the magnetic shielding cover 4 is rotated with the encoder bracket 5 being covered with the magnetic shielding cover 4. The other details are equivalent to the encoder 21 according to the first embodiment.

In the encoder 23 according to the third embodiment, the male thread 53 and the female thread 46 are tightened together by rotating the magnetic shielding cover 4 with the encoder bracket 5 being covered with the magnetic shielding cover 4. By so doing, the sealing member 6 is compressed, thereby making it possible to realize a certain satisfactory dustproof and waterproof effect. Because compression of the sealing member 6 does not take place between curved surfaces, the protective cover 3 and the encoder bracket 5 need not be worked or machined with high accuracy and thus do not lead to any factor for increase in manufacturing cost.

Fourth Embodiment

Figure 8:
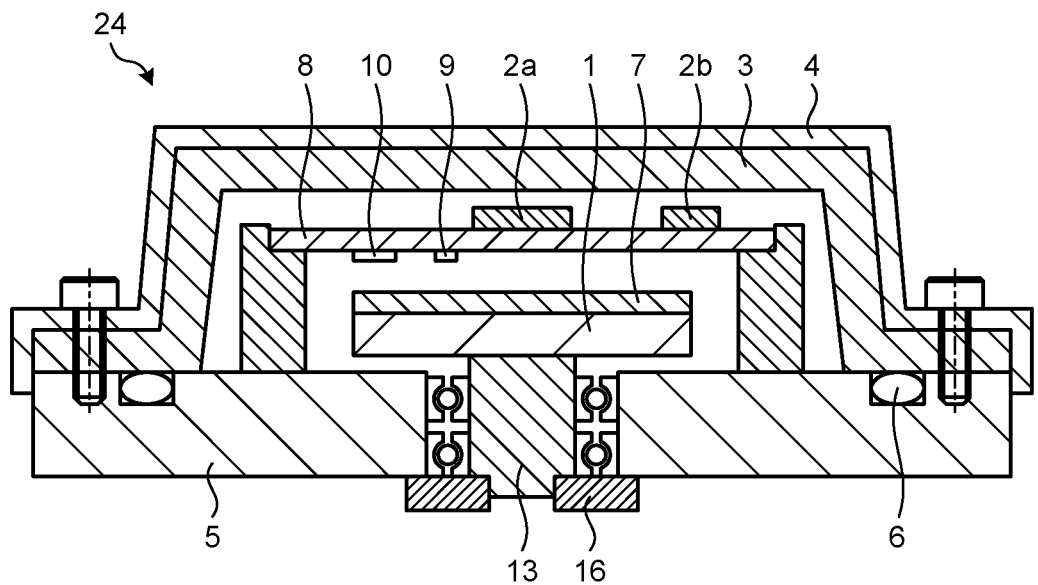
FIG. 8 is a sectional view of an encoder according to a fourth embodiment of the present invention.

FIG. 8 is a sectional view of an encoder according to the fourth embodiment of the present invention. The encoder 24 according to the fourth embodiment is of an optical type. The magnetic field sensor 2a of the encoder 24 according to the fourth embodiment is a composite magnetic wire by which a Barkhausen effect can be expected. As a direction of a magnetic field varies according to a rotation angle of the magnet 1, a voltage pulse is outputted from the composite magnetic wire due to the Barkhausen effect. By performing computation using voltage pulses outputted by the magnetic field sensor 2a, the arithmetic unit 2b can detect a rotation direction and the number of rotations of the encoder shaft 13 rotating with the magnet 1. The control board 8 is provided with a light emitting device 9 and a light receiving device 10. A metal sheet 7 provided with an optical pattern is adhesively fixed to the magnet 1. Light emitted from the light emitting device 9 reflects off the metal sheet 7 and enters the light receiving device 10. The arithmetic unit 2b detects the rotation angle of the magnet 1 by performing arithmetic processing based on an output of the light receiving device 10.

In the fourth embodiment, the magnetic shielding cover 4 also covers a peripheral part of the protective cover 3, thus preventing a magnetic field from entering from the peripheral part of the protective cover 3.

The encoder 24 according to the fourth embodiment differs from the encoder 21 according to the first embodiment in that the encoder 24 is of the optical type. However, as with the encoder 21 according to the first embodiment, the encoder 24 has waterproof and dustproof properties and can reduce an increase in manufacturing cost.

Fifth Embodiment

Figure 9:
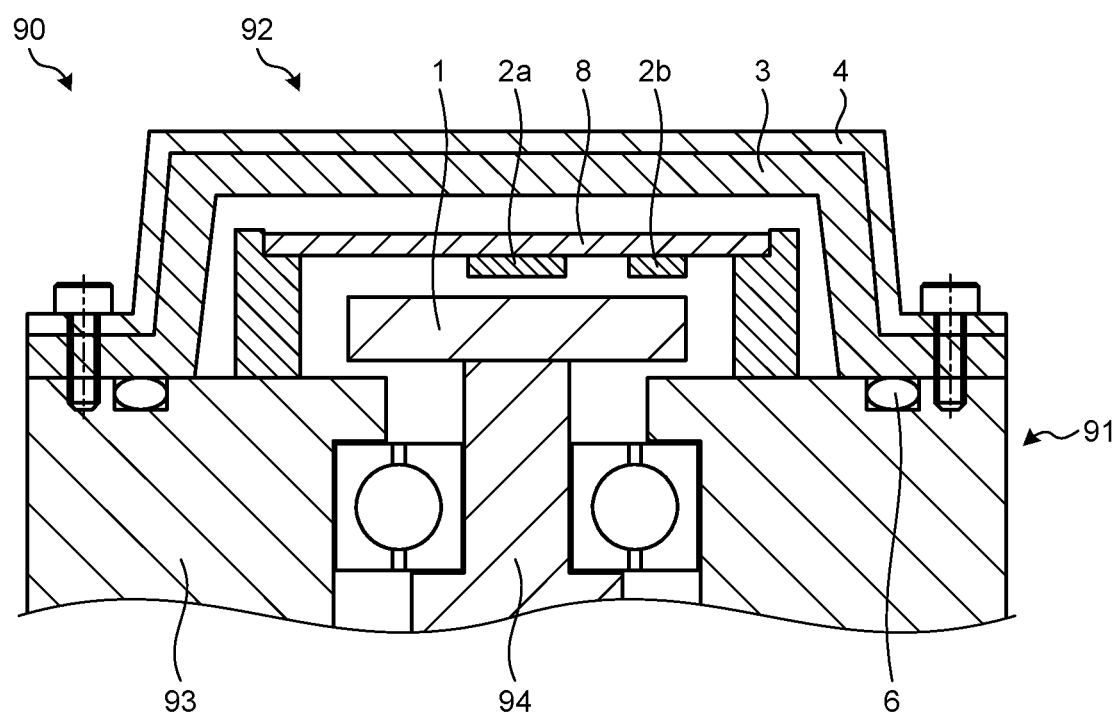
FIG. 9 is a sectional view of a motor according to a fifth embodiment of the present invention.

FIG. 9 is a sectional view of a motor according to the fifth embodiment of the present invention. The motor 90 according to the fifth embodiment is of an encoder-integrated type that has an encoder unit 92 and a drive unit 91 that drives rotation of a motor shaft 94. The encoder unit 92 is similar in structure to the encoder 21 according to the first embodiment. However, the encoder unit 92 does not have the encoder bracket 5, and the magnetic shielding cover 4 is fixed to a motor bracket 93. This means that in the fifth embodiment, the motor bracket 93 serves as a base part to which the magnetic shielding cover 4 is fixed. The magnet 1 is adhesively fixed to the motor shaft 94.

Without increasing manufacturing costs, the motor 90 according to the fifth embodiment enables the encoder unit 92 to have waterproof and dustproof properties.

Although the motor 90 described above includes the encoder unit 92 that is similar in structure to the encoder 21 according to the first embodiment, the motor 90 may have an encoder unit 92 similar to the encoder 22 according to the second embodiment, the encoder 23 according to the third embodiment, or the encoder 24 according to the fourth embodiment.

The above configurations illustrated in the embodiments correspond to examples of contents of the present invention, and each thereof can be combined with other publicly known techniques and partially omitted and/or modified without departing from the scope of the present invention.

REFERENCE SIGNS LIST 1 magnet; 2a magnetic field sensor; 2b arithmetic unit; 3 protective cover; 4 magnetic shielding cover; 5 encoder bracket; 6 sealing member; 7 metal sheet; 8 control board; 9 light emitting device; 10 light receiving device; 13 encoder shaft; 14, 15 screw; shaft coupling; 21, 22, 23, 24 encoder; 31 gate portion; 32 connector; 41 hole; 42 notch; 43 hook part; convex part; 45 snap-fit convex part; 46 female thread; 51 concave part; 52 snap-fit concave part; 53 male thread; 90 motor; 91 drive unit; 92 encoder unit; motor bracket; 94 motor shaft.

The invention claimed is:

1. An encoder comprising:
a magnet rotatably supported;
a control board including a magnetic field sensor to detect a magnetic field produced by the magnet to accordingly output a signal, and an arithmetic unit to detect rotation of the magnet based on an output of the magnetic field sensor;
a magnetic shielding cover made of a soft magnetic material;
a base part used to fix the magnetic shielding cover;
a protective cover fixed with being sandwiched between the magnetic shielding cover and the base part, the protective cover covering the magnet and the control board to prevent entry of a foreign material thereinto; and
a sealing member sandwiched directly between the protective cover and the base part, wherein
the magnetic shielding cover covers the magnet, the control board, and the protective cover, and
the sealing member is compressed between the base part and the protective cover.

2. The encoder according to claim 1, wherein the magnetic shielding cover and the protective cover are screwed together to the base part.

3. The encoder according to claim 2, wherein
the base part includes a hook part that is hook-shaped, and
a part of a peripheral portion of the magnetic shielding cover is engaged with the hook part together with a part of a peripheral portion of the protective cover to be fixed to the base part.

4. The encoder according to claim 1, wherein the magnetic shielding cover is screwed to the base part in a direction perpendicular to a rotation axis of the magnet.

5. The encoder according to claim 4, wherein
an outer peripheral surface of the base part has a concave part formed thereon, and
a part of a peripheral portion of the magnetic shielding cover has formed thereon a convex part to be engaged with the concave part.

6. The encoder according to claim 1, wherein
a peripheral portion of the magnetic shielding cover has a snap-fit convex part formed thereon,
an outer peripheral surface of the base part has a snap-fit concave part formed thereon, and
the magnetic shielding cover is fixed to the base part by fitting the snap-fit convex part into the snap-fit concave part.

7. The encoder according to claim 1, wherein
an inner surface of a marginal part of the magnetic shielding cover has a female thread formed thereon,
an outer peripheral surface of the base part has a male thread formed thereon, and
the magnetic shielding cover is fixed to the base part by tightening of the female thread and the male thread.

8. The encoder according to claim 1, wherein
the magnetic field sensor is a Hall sensor or a magnetoresistive element, and
the arithmetic unit detects a rotation angle of the magnet on the basis of change of a direction and a strength of a magnetic field caused by the magnet.

9. The encoder according to claim 1, comprising:
a metal sheet having an optical pattern, which rotates with the magnet;
a light emitting device mounted to the control board to irradiate the optical pattern with light; and
a light receiving device mounted to the control board to receive light outputted from the light emitting device through the optical pattern, wherein
the magnetic field sensor is a composite magnetic wire, and
the arithmetic unit determines a rotation direction and the number of rotations of the magnet on the basis of an output of the composite magnetic wire and determines a rotation angle of the magnet on the basis of an output of the light receiving device.

10. A motor comprising: an encoder unit using the encoder according to claim 1; and a drive unit to drive rotation of a motor shaft, wherein
the magnet is fixed to the motor shaft.

* * * * *